(12) United States Patent
Hattori et al.

(10) Patent No.: US 9,403,302 B2
(45) Date of Patent: Aug. 2, 2016

(54) FABRICATION METHOD AND FABRICATION DEVICE FOR COMPOSITE MATERIAL HOLLOW PART

(75) Inventors: Hidetaka Hattori, Tokyo (JP); Hideki Horizono, Tokyo (JP); Tadashi Yazaki, Tokyo (JP); Naoaki Fujiwara, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 140 days.

(21) Appl. No.: 13/981,204

(22) PCT Filed: Mar. 28, 2012

(86) PCT No.: PCT/JP2012/058149
§ 371 (c)(1),
(2), (4) Date: Jul. 23, 2013

(87) PCT Pub. No.: WO2012/133534
PCT Pub. Date: Oct. 4, 2012

(65) Prior Publication Data
US 2013/0299072 A1 Nov. 14, 2013

(30) Foreign Application Priority Data
Mar. 31, 2011 (JP) ................................ 2011-081255

(51) Int. Cl.
*B29C 70/34* (2006.01)
*B29C 43/12* (2006.01)
(Continued)

(52) U.S. Cl.
CPC ............... *B29C 43/12* (2013.01); *B29C 70/342* (2013.01); *B29C 70/44* (2013.01); *B29C 70/446* (2013.01); *B29C 2043/3644* (2013.01)

(58) Field of Classification Search
CPC ............ B29C 43/12; B29C 2043/3644; B29C 70/446; B29C 70/44; B29C 70/342
USPC ......................... 156/217, 218; 264/313, 314
See application file for complete search history.

(56) References Cited

U.S. PATENT DOCUMENTS

| 4,878,979 A | 11/1989 | Steinbach |
| 5,939,007 A * | 8/1999 | Iszczyszyn et al. ........... 264/258 |

(Continued)

FOREIGN PATENT DOCUMENTS

| DE | 1183353 B * | 12/1964 |
| EP | 1 162 055 | 12/2001 |

(Continued)

OTHER PUBLICATIONS

BriskHeat Corporation, "VT Vacuum Curing and Debulking Table", selected screen shots from video posted Oct. 5, 2010 at https://www.youtube.com/watch?v=FzFcWWFHALM, 3 pages.*

(Continued)

*Primary Examiner* — William Bell
(74) *Attorney, Agent, or Firm* — Wenderoth, Lind & Ponack, L.L.P.

(57) ABSTRACT

A fabrication method and a fabrication device capable of fabricating medium-scale mass production parts. The method of fabricating a composite material hollow part includes: holding a tool on a frame using a holding section that maintains a gap between the tool and the frame, placing a prepreg on the tool, covering the tool and the prepreg using a highly stretchable sheet, securing the highly stretchable sheet and the frame with a securing jig so that tension is applied to the highly stretchable sheet from the top portion of the prepreg where the highly stretchable sheet contacts the prepreg at the highly stretchable sheet and the outer periphery of both the tool and the prepreg to the edges of the highly stretchable sheet, thereby forming an enclosed space that houses the tool and the prepreg, and subsequently evacuating the inside of the enclosed space to wrap the prepreg around the tool.

8 Claims, 6 Drawing Sheets

(51) Int. Cl.
   *B29C 70/44*   (2006.01)
   *B29C 43/36*   (2006.01)

(56) References Cited

U.S. PATENT DOCUMENTS

| | | |
|---|---|---|
| 2002/0011047 A1* | 1/2002 | Obeshaw .................... 52/794.1 |
| 2002/0012591 A1* | 1/2002 | Montague et al. ........ 416/241 R |
| 2004/0081551 A1 | 4/2004 | Wobben |
| 2005/0175451 A1 | 8/2005 | Wobben |
| 2006/0197250 A1* | 9/2006 | Shimada et al. .............. 264/102 |
| 2010/0181017 A1 | 7/2010 | Shinoda et al. |
| 2011/0049770 A1 | 3/2011 | Stiesdal |

FOREIGN PATENT DOCUMENTS

| | | |
|---|---|---|
| JP | 7-60770 | 3/1995 |
| JP | 2005-288785 | 10/2005 |
| JP | 2006-7492 | 1/2006 |
| JP | 2009-51112 | 3/2009 |
| JP | 2011-507739 | 3/2011 |
| WO | 2008/041556 | 4/2008 |
| WO | WO 2008152582 A2 * | 12/2008 |

OTHER PUBLICATIONS

Decision to Grant a Patent issued Nov. 11, 2014 in corresponding Japanese patent application No. 2011-081255 (with English translation).

Extended European Search Report issued Mar. 24, 2015 in corresponding European patent application No. 12764458.1.

International Search Report issued Jun. 26, 2012 in International Application No. PCT/JP2012/058149.

Written Opinion of the International Searching Authority issued Jun. 26, 2012 in International Application No. PCT/JP2012/058149.

\* cited by examiner

FABRICATION METHOD AND FABRICATION DEVICE FOR COMPOSITE MATERIAL HOLLOW PART

BACKGROUND OF THE INVENTION

1. Technical Field

The present invention relates to a fabrication method and a fabrication device for a composite material hollow part.

2. Description of the Related Art

Resin-based composite materials such as fiber-reinforced plastics are lightweight and have high mechanical strength, and are therefore widely used as structural members for aircraft, automobiles, and ships and the like. Resin-based composite materials are generally formed by stacking a plurality of layers of a prepreg composed of a resin that has been reinforced with fiber, and then subjecting the stacked structure to a heat and pressure treatment (see Japanese Unexamined Patent Application, Publication No. Hei 7-60770).

The methods used for fabricating hollow parts formed from resin-based composite materials include hand lay-up fabrication methods and machine-based lay-up fabrication methods.

In a hand lay-up fabrication method, an operator manually wraps a prepreg onto a tool, and a heat and pressure treatment is then performed to cure the resin. Hand lay-up fabrication methods offer the advantage that they require minimal capital investment, but the wrapping force is generally small.

In a machine-based lay-up fabrication method, the prepreg is wrapped around a tool while a force is applied by the machine, and a heat and pressure treatment is subsequently performed to cure the resin. Machine-based lay-up fabrication methods require a large initial capital investment, but are ideal for the mass production of parts.

SUMMARY OF THE INVENTION

1. Technical Problem

When a prepreg is subjected to heating and pressure, the resin softens. As the resin softens, the fibers within the fiber-reinforced base material are able to move more readily, and the application of pressure can cause localized variation in the thickness. This change in the thickness eliminates any appropriate spaces into which surplus fiber can move, and therefore the plate may undergo curing with this uneven distribution of fibers maintained, resulting in the generation of wrinkles in the fabricated product. This variation in the thickness increases as the thickness of the fabricated product increases, resulting in an increased likelihood of surplus fiber in the circumferential direction, and deterioration in the quality of the fabricated product.

Resin cure shrinkage and the pressure applied during curing affect the generation of surplus fiber. If the wrapping force applied during lay-up is small, then the fibers are more likely to be loose, which promotes the formation of wrinkles. FIG. 8 is a schematic cross-sectional view illustrating the process of wrapping a prepreg around a tool using a hand lay-up fabrication method. The left-hand side of the figure represents the prepreg prior to curing, and the right-hand side represents the prepreg following curing. As illustrated in FIG. 8, because the wrapping force is small in a hand lay-up fabrication method, achieving favorable fabricated product quality is difficult. In a machine-based lay-up fabrication method, because the wrapping force is large, fabrication can be performed without generating wrinkles, but for parts such as aircraft parts that require medium-scale mass production, the initial capital investment can be a significant burden.

The present invention has been developed in light of these circumstances, and has an object of providing a fabrication method and a fabrication device that are capable of fabricating medium-scale mass production parts of high fabrication quality with minimal capital investment, while suppressing the generation of wrinkles even in those cases where the thickness is large.

2. Solution to the Problem

In order to achieve the above object, the present invention provides a method of fabricating a composite material hollow part. The method comprises: holding a tool on a frame using a holding section that maintains a gap between the tool and the frame, placing a prepreg formed from a fiber-reinforced resin on the tool, covering the tool and the prepreg from above the prepreg using a highly stretchable sheet, securing the highly stretchable sheet and the frame with a securing jig so that tension is applied to the highly stretchable sheet from the top portion of the prepreg where the highly stretchable sheet contacts the prepreg at the highly stretchable sheet and the outer periphery of both the tool and the prepreg to the edges of the highly stretchable sheet, thereby forming an enclosed space inside which the tool and the prepreg are housed, and subsequently evacuating the inside of the enclosed space using an evacuation device connected to the inside of the enclosed space, thereby wrapping the prepreg around the tool.

According to the invention described above, because the highly stretchable sheet is secured so that tension is applied to the top portion of the prepreg, when the enclosed space is subsequently evacuated, the inside of the enclosed space changes to a vacuum state starting at the top portion of the prepreg. As a result, vacuum pressure is first applied to the top portion of the prepreg in the initial stage of the evacuation, and the air surrounding the tool and the lower portions of the prepreg is then removed, thereby wrapping the prepreg around the surface of the tool. Because the prepreg is wrapped tightly against the surface of the tool with no surplus, the generation of wrinkles in the cured resin caused by the wrapping force can be reduced.

In one aspect of the invention described above, the tool is preferably positioned so that the top portion of the prepreg forms a convex surface in a direction following the outer periphery of the prepreg.

By positioning the tool in the manner described above, tension can be more easily applied to the top portion of the prepreg, and the closeness of the contact between the prepreg and the tool can be further improved.

In one aspect of the invention described above, a release film is preferably interposed between the edges of the prepreg and the member that acts as the underlying substrate beneath the edges of the prepreg.

In the aspect of the invention described above, a release film is interposed between the edges of the prepreg and the tool, or between the prepreg that is to undergo wrapping treatment, and a prepreg that has been wrapped onto the tool in advance and functions as a substrate. As a result, the edges of the prepreg can be released from the tool surface even after the wrapping treatment, thereby facilitating cutting of any excess at the edges of the prepreg.

In one aspect of the invention described above, an elastic member that exhibits elasticity in the direction leading from the frame toward the tool may be positioned on the frame opposing the tool, and a press jig which is capable of using the reactive force of the elastic member to press against the surface of the tool that faces the frame may be positioned on the elastic member.

According to the aspect of the invention described above, because the edges of the prepreg are not adhered to the surface of the tool even following the wrapping treatment, any excess at the edges of the prepreg can be cut easily. Further, in those cases where a second layer prepreg or third layer prepreg is stacked on the underlying prepreg, because the edges of the previously wrapped prepreg can be pressed while the wrapping of the next prepreg is performed, the generation of wrinkles at the edges can be suppressed.

Furthermore, the present invention also provides a device for fabricating a composite material hollow part. The device comprises a frame, a tool for wrapping a prepreg formed from a fiber-reinforced resin, a holding section that holds the tool on the frame with a gap maintained between the tool and the frame, a highly stretchable sheet that covers the tool and the prepreg from above the prepreg, a securing jig which secures the highly stretchable sheet and the frame so that tension is applied to the highly stretchable sheet from the top portion of the prepreg where the highly stretchable sheet contacts the prepreg at the highly stretchable sheet and the outer periphery of both the tool and the prepreg to the edges of the highly stretchable sheet, thereby forming an enclosed space inside which the tool and the prepreg are housed, and an evacuation device that is connected to the inside of the enclosed space so as to enable the inside of the enclosed space to be evacuated.

According to the invention described above, because the highly stretchable sheet is secured so that tension is applied to the top portion of the prepreg, when the enclosed space is subsequently evacuated, the inside of the enclosed space changes to a vacuum state starting at the top portion of the prepreg. As a result, vacuum pressure is first applied to the top portion of the prepreg in the initial stage of the evacuation, and the air surrounding the tool and the lower portions of the prepreg is then removed, thereby wrapping the prepreg around the surface of the tool. Because the prepreg is wrapped tightly against the surface of the tool with no surplus, the generation of wrinkles in the cured resin caused by the wrapping force can be reduced.

In one aspect of the invention described above, the tool is preferably positioned so that the top portion of the prepreg forms a convex surface in a direction following the outer periphery of the prepreg.

By positioning the tool in the manner described above, tension can be more easily applied to the top portion of the prepreg, and the closeness of the contact between the prepreg and the tool can be further improved.

In one aspect of the invention described above, a release film is preferably disposed between the edges of the prepreg and the member that acts as the underlying substrate beneath the edges of the prepreg.

In this aspect of the invention described above, a release film is interposed between the edges of the prepreg and the tool, or between the prepreg that is to undergo wrapping treatment, and a prepreg that has been wrapped onto the tool in advance and functions as a substrate. As a result, the edges of the prepreg can be released from the tool surface even after the wrapping treatment, thereby facilitating cutting of any excess at the edges of the prepreg.

In one aspect of the invention described above, the device may also comprise an elastic member, which is positioned on the frame opposing the tool and exhibits elasticity in the direction leading from the frame toward the tool, and a press jig which is disposed on the elastic member and is capable of using the reactive force of the elastic member to press against the surface of the tool that faces the frame.

According to the aspect of the invention described above, because the edges of the prepreg are not adhered to the surface of the tool even following the wrapping treatment, any excess at the edges of the prepreg can be cut easily. Further, in those cases where a second layer prepreg or third layer prepreg is stacked on the underlying prepreg, because the edges of the previously wrapped prepreg can be pressed while the wrapping of the next prepreg is performed, the generation of wrinkles at the edges can be suppressed.

3. Advantageous Effects of the Invention

According to the present invention, parts of high fabrication quality can be fabricated with minimal capital investment, while suppressing the generation of wrinkles.

DETAILED DESCRIPTION OF THE INVENTION

Figure 1:
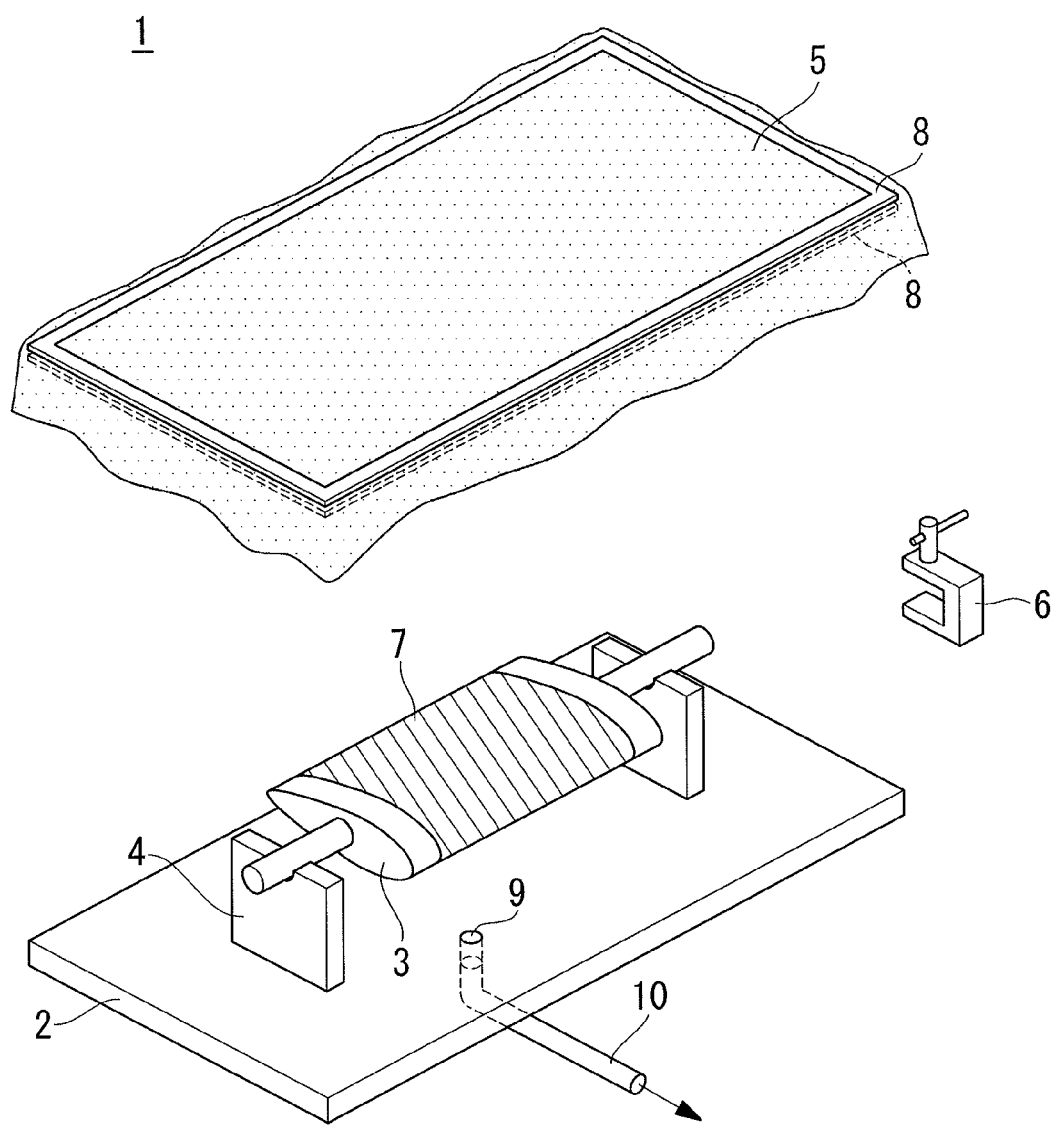
FIG. 1 is an exploded perspective view of a fabrication device according to one embodiment of the present invention.

An embodiment of the fabrication method and fabrication device for a composite material hollow part according to the present invention is described below with reference to the drawings. FIG. 1 is an exploded perspective view of a fabrication device according to this embodiment. The fabrication device 1 comprises a frame 2, a tool 3, a holding section 4, a highly stretchable sheet 5, a securing jig 6, and an evacuation device (not shown in the figure).

The frame 2 is composed of a material typically used for composite material fabrication jigs. Examples of the material include aluminum alloys, steel alloys such as stainless steel or invar, and fiber-reinforced composite materials.

The tool 3 is an aluminum alloy, a steel alloy such as stainless steel or invar, or a fiber-reinforced composite material having a predetermined shape that corresponds with the fabricated product.

The holding section 4 can hold the tool 3 with a gap maintained between the tool 3 and the frame 2, namely in a state where the tool 3 floats above the frame 2. In the present embodiment, the holding section 4 is secured to the top of the frame, and the tool 3 is held by mounting both ends of the tool 3 on the holding section 4.

The highly stretchable sheet 5 is secured to the frame 2 by the securing jig 6. The highly stretchable sheet 5 is formed from a material which, when secured with the securing jig 6 so as to cover the tool 3 and the prepreg 7, is able to apply tension from the portion that contacts the prepreg 7 down to the edges of the highly stretchable sheet, thereby forming an internal enclosed space. Further, the highly stretchable sheet 5 has a level of ductility that enables the sheet to cover the exterior periphery of the tool when the inside of the enclosed space is evacuated using an evacuation device. For example, a silicone sheet having a breaking elongation of not less than 700%, a rupture strength of not less than 9.0 MPa and a thickness of 1.6 mm can be used. In the present embodiment, as illustrated in FIG. 1, a silicone sheet sandwiched from above and below between rigid frames 8 is used as the highly stretchable sheet 5.

The securing jig 6 is composed of C-clamps or the like. A plurality of these C-clamps is provided so that when the highly stretchable sheet 5 is secured to the frame 2, the interior becomes an enclosed space.

The evacuation device may be a vacuum pump or the like that is capable of evacuating the inside of the aforementioned enclosed space down to a desired degree of vacuum. For example, an oil-sealed rotary vacuum pump having an ultimate pressure of 2.7 Pa (catalog value) and a design exhaust speed of 1,600 L/min (catalog value) can be used. The evacuation device is connected to the inside of the enclosed space by an evacuation hose 10 connected to a through-hole 9 provided in the frame. The connection position of the evacuation device is set appropriately in accordance with factors such as the shape and size of the fabricated product.

Next is a description of a method of fabricating a composite material hollow part according to the present embodiment.

Figure 2:
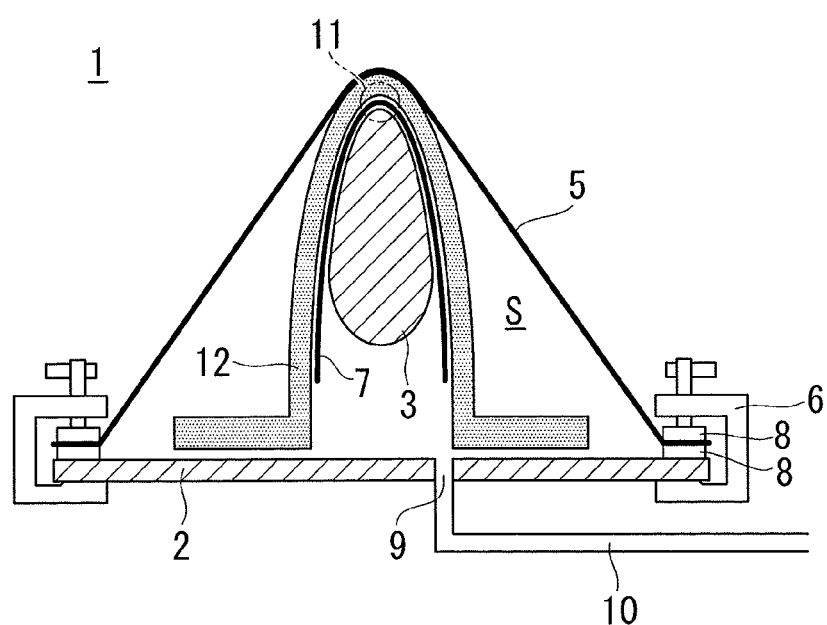
FIG. 2 is a cross-sectional view of the fabrication device prior to wrapping of the prepreg around the tool.

FIG. 2 illustrates a cross-sectional view of the fabrication device 1 prior to wrapping the prepreg 7 around the tool 3. First, the tool 3 is positioned on top of the frame 2. The tool 3 is held with a gap maintained between the tool 3 and the frame 2. In other words, the ends of the tool 3 are held by the holding section (not shown in the figure) so that the tool 3 floats above the frame 2. The tool 3 is preferably positioned so that the top portion 11 of the tool forms a convex surface in a direction following the outer periphery of the tool. In other words, the tool 3 is preferably positioned so that the surface of the tool positioned opposite the frame 2 has a convex shape in a direction following the outer periphery of the tool. The top portion 11 indicates the portion located on the opposite side to the frame 2. It is particularly desirable that the tool 3 is positioned so that the most tapered portion of the tool functions as the top portion. The tool surface may be coated with an appropriate release agent.

Next, a prepreg 7 formed from a fiber-reinforced resin is placed on top of the tool 3. In the present embodiment, the prepreg 7 is formed from a composite material containing mainly a carbon fiber-reinforced plastic (CFRP). The prepreg 7 is preferably precut to a size that matches the shape of the tool, and is then placed on top of the tool so that the central portion of the prepreg 7 is overlaid on the top portion of the tool 3.

Subsequently, the highly stretchable sheet 5 is disposed so as to cover the tool 3 and the prepreg 7 from above the prepreg 7, and bagging is performed. Subsequently, the rigid frames 8 provided at the edges of the highly stretchable sheet 5 are aligned with the edges of the frame 2, and the two are then secured using C-clamps 6. As a result, an enclosed space S surrounded by the frame 2 and the highly stretchable sheet 5 is formed. The tool 3 and the prepreg 7 are housed inside this enclosed space S. In the present embodiment, the surface area inside the rigid frames 8 of the highly stretchable sheet 5 is substantially the same as the surface area of the frame 2. Accordingly, following securing, the highly stretchable sheet 5 is stretched compared with the state prior to securing by an amount equivalent to the tool 3 and the prepreg 7 housed inside the enclosed space S. In other words, tension is applied to the highly stretchable sheet 5 with the top portion of the prepreg 7 and the portions secured by the C-clamps 6 acting as support points.

If required, a member 12 for ensuring an air flow path and ensuring favorable releasability may be disposed between the prepreg 7 and the highly stretchable sheet 5. Examples of the member for ensuring an air flow path include a polyester vent mat or a peel ply or the like. Examples of the member for ensuring favorable releasability include release films and the like.

Figure 3:
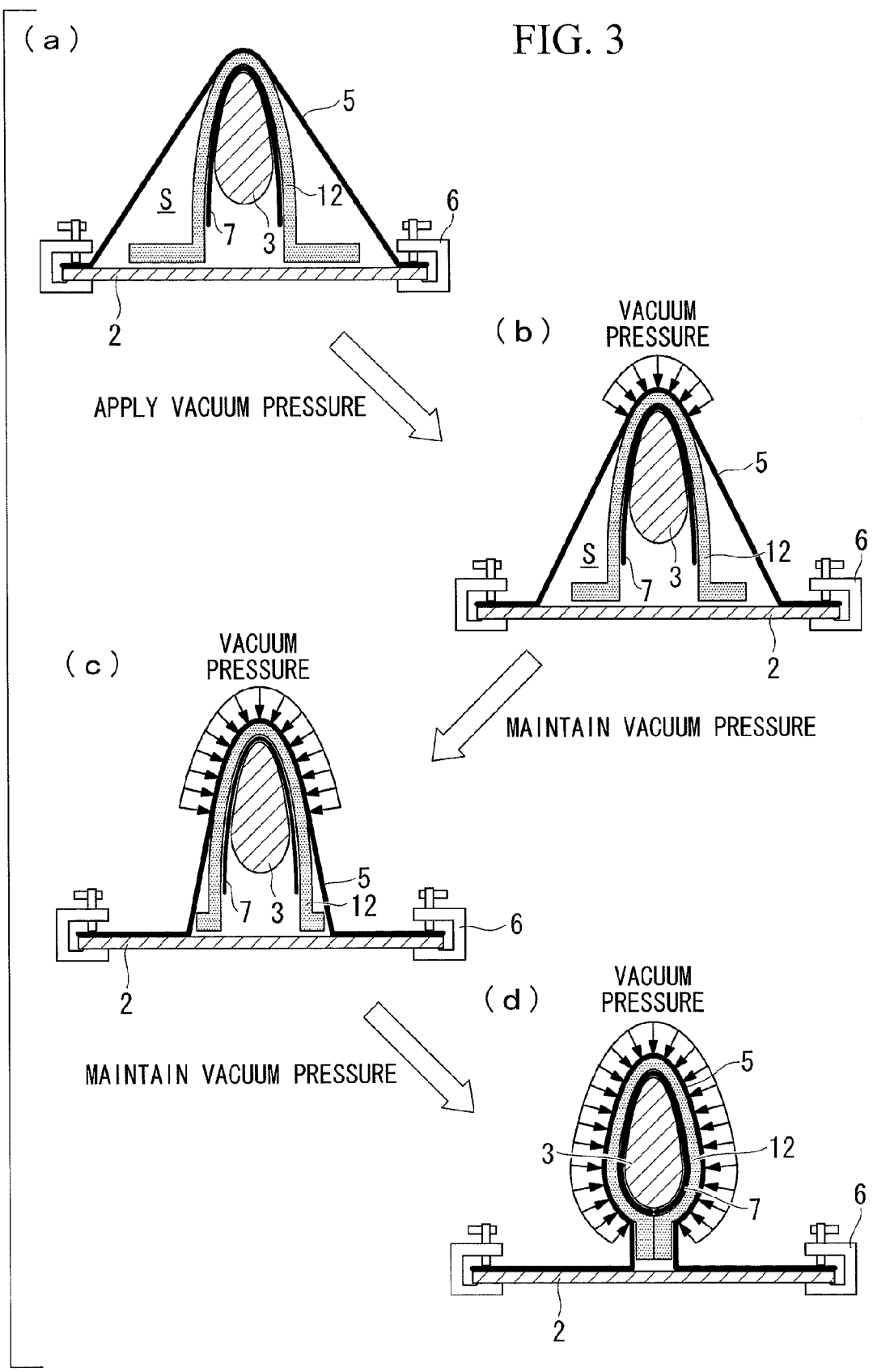
FIG. 3 is a flow diagram illustrating the application of vacuum pressure during wrapping of the prepreg around the tool.

Next, the inside of the enclosed space S is evacuated, and a vacuum pressure is applied. The evacuation conditions may be selected appropriately in accordance with factors such as the shape and size of the fabricated product, and the volume inside the enclosed space S. FIG. 3 is a flow diagram illustrating the application of vacuum pressure during wrapping of the prepreg 7 around the tool 3. In FIG. 3, in order to simplify the figures, the rigid frames 8, the evacuation hole 9 and the evacuation hose 10 are not shown.

FIG. 3($a$) illustrates the state prior to application of vacuum pressure. The edges of the prepreg 7 are illustrated hanging down in the direction of gravity, but these edges may also be held in place temporarily, for example by an operator manually pressing the edges against the tool 3. When the inside of the enclosed space S is evacuated, a vacuum pressure is first applied to the portion where the highly stretchable sheet 5 contacts the top portion of the tool 3 (prepreg) (FIG. 3($b$)). By simply maintaining the vacuum pressure inside the enclosed space S, vacuum pressure is sequentially applied to lower portions of the tool 3 (nearer the frame) (FIG. 3($c$)), until finally, the prepreg 7 is wrapped tightly around the periphery of the tool 3 (FIG. 3($d$)).

In the present embodiment, evacuation of the inside of the enclosed space S is performed without heating the prepreg 7. In other words, the vacuum pressure is applied and the prepreg 7 is wrapped with the resin contained within the prepreg 7 maintained in a non-fluid state. As a result, the prepreg 7 can be wrapped tightly onto the tool without any change in the thickness of the prepreg 7.

Figure 4:
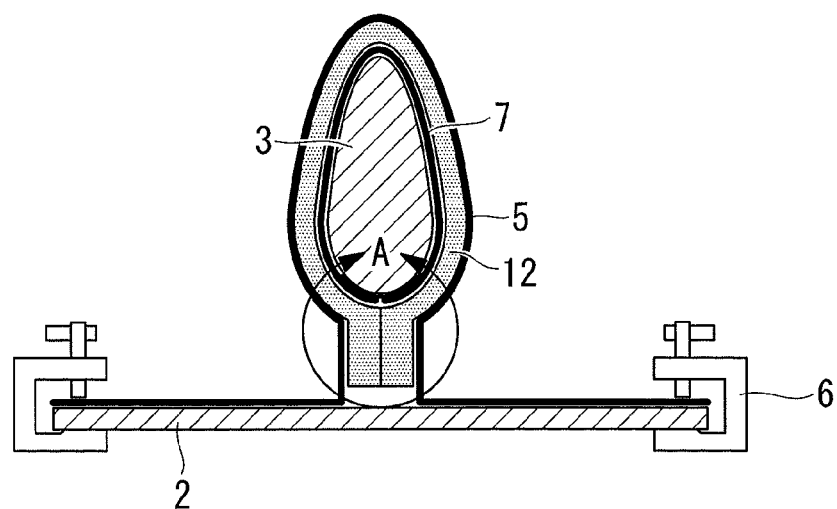
FIG. 4 is a cross-sectional view of the fabrication device following wrapping of the prepreg around the tool.
Figure 5:
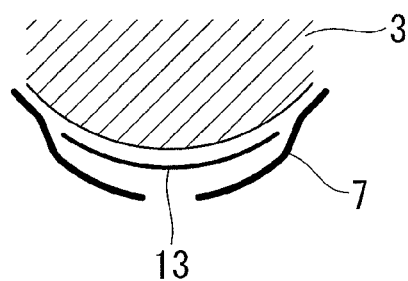
FIG. 5 is an enlarged view of region A shown in FIG. 4.

FIG. 4 illustrates a cross-sectional view of the fabrication device following wrapping of the prepreg 7 around the tool 3. In other words, the prepreg 7 is wrapped in a state of tight contact around the tool 3, and the highly stretchable sheet 5 is wrapped around the outer periphery in a more highly stretched state than that prior to evacuation. FIG. 5 illustrates an enlarged view of the region A of FIG. 4. Prior to formation of the enclosed space S, a release film 13 is interposed between the edges of the prepreg 7 and the member that acts as the substrate beneath the edges of the prepreg 7 (the tool 3 in the case of FIG. 5). A film of FEP (tetrafluoroethylene-hexafluoropropylene copolymer resin) can be provided as the release film 13. At this time, the release film 13 may be secured using a spray adhesive or the like.

As illustrated in FIG. 5, because the release film 13 is interposed between the edges of the prepreg 7 and the tool 3, the edge portions of the prepreg 7 can be easily peeled from the tool 3. In those cases where surplus portions exist at the edges of the prepreg 7, those surplus portions may be cut as appropriate.

The steps described above represent one wrapping cycle for the prepreg 7, and the wrapping cycle may be repeated as appropriate to stack multiple layers of the prepreg 7 depending on the fabricated product. In this case, the orientation of the tool 3 may be altered for each wrapping cycle, thereby shifting the position of the top portion of the tool. By using this technique, the portions corresponding with the edges of each layer of the prepreg 7 do not overlap, and therefore any effect on the strength of the product can be minimized.

Further, in this embodiment, one layer of the prepreg 7 was wrapped about the tool in each wrapping cycle, but depending on the variety and thickness of the prepreg 7, and the application, shape and size of the fabricated product, a plurality of superimposed layers of the prepreg 7 may be wrapped about the tool 3 in a single wrapping cycle.

The orientation ratio of the fibers of the prepreg 7 is set to the type of value typically used for aircraft structural members. For example, if the direction of extension (the lengthwise direction) of a main wing is deemed to be 0°, then a plurality of sheets may be stacked on each other so that the ratio of the various fiber directions satisfies (0°, +45°, −45°, 90°)=(25%, 25%, 25%, 25%).

Figure 6:
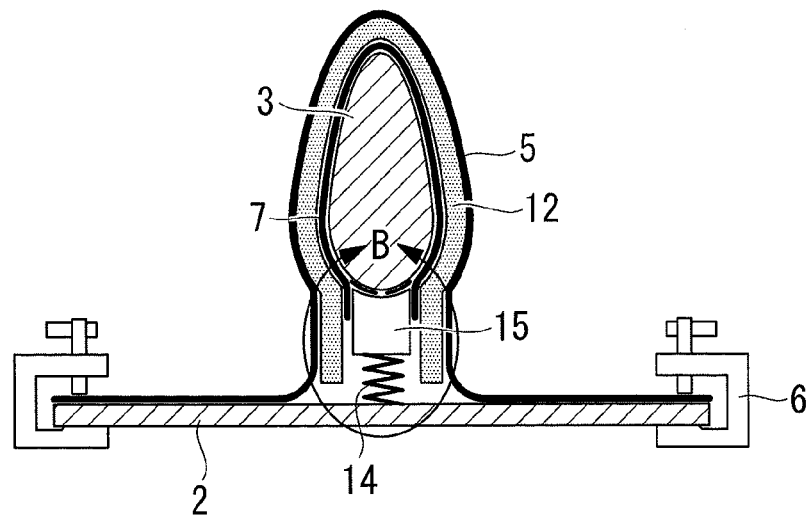
FIG. 6 is a diagram illustrating an example of the positioning of a press jig to which an elastic member is connected.
Figure 7:
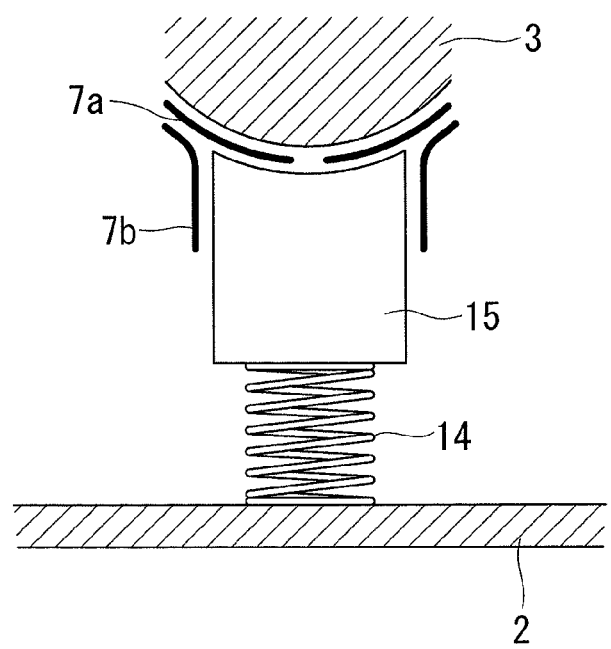
FIG. 7 is an enlarged view of region B shown in FIG. 6.
Figure 8:
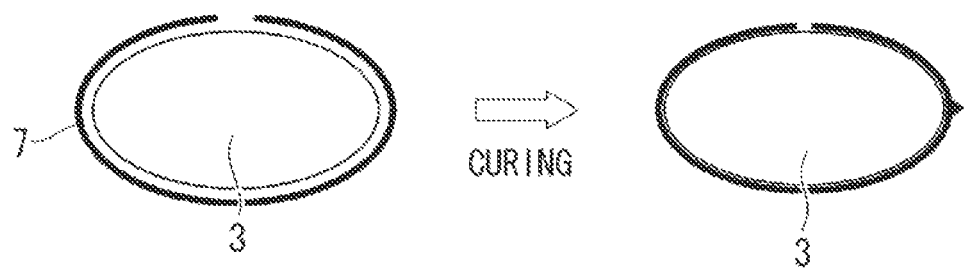
FIG. 8 is a schematic cross-sectional view illustrating the wrapping of a prepreg onto a jig using a conventional hand lay-up fabrication method.

Instead of the release film 13, a press jig connected to an elastic member may be provided to prevent the edges of the prepreg 7 from adhering to the underlying substrate. FIG. 6 illustrates an example of the positioning of a press jig 15 to which an elastic member 14 is connected. FIG. 7 illustrates an enlarged view of the region B shown in FIG. 6.

FIG. 6 is a diagram illustrating a case in which a second wrapping cycle has been used to wrap a second prepreg 7b on top of the tool 3 having a first prepreg 7a wrapped thereon via a first wrapping cycle. As illustrated in FIG. 6, the elastic member 14 is secured on the surface of the frame 2 in a position where the tool 3 and the frame 2 oppose one another. The elastic member 14 exhibits elasticity in the direction leading from the frame 2 toward the tool 3, and is formed, for example, using a spring or the like. The press jig 15 is connected to the top of the spring. The press jig 15 can use the reactive force of the spring to press against the surface of the tool 3 that faces the frame 2.

By using the press jig 15 to press against the edges of the first prepreg 7a instead of using the aforementioned release film 13, residues from the release film 13 can be prevented, and the amount of force pressing against the previously wrapped prepreg (the first prepreg 7a) at the underside of the tool can be increased.

According to the embodiment described above, by applying tension to the highly stretchable sheet 5 and bringing the highly stretchable sheet 5 into contact with the top portion of the prepreg 7, the sequence in which vacuum pressure is applied to the prepreg 7 can be controlled. As a result, the prepreg 7 can be wrapped tightly about the tool 3 with minimal initial capital investment.

Following stacking of a predetermined number of layers of the prepreg 7 using the steps described above, a heat and pressure treatment is performed to cure the resin of the prepreg. Subsequently, the product is released appropriately from the tool to obtain a composite material hollow part. According to the embodiment described above, because the generation of wrinkles can be reduced, the quality of the composite material hollow part can be improved.

REFERENCE SIGNS LIST

1 Fabrication device
2 Frame
3 Tool
4 Holding section
5 Highly stretchable sheet
6 Securing jig
7 Prepreg
8 Rigid frame
9 Through-hole
10 Evacuation hose
11 Top portion
12 Member for ensuring air flow path
13 Release film
14 Elastic member
15 Press jig

The invention claimed is:

1. A method of fabricating a composite material hollow part, the method comprising:
   holding a tool on a frame using a holding section that maintains a gap between the tool and the frame, wherein the tool is arranged so that an uppermost portion of the tool forms a convex surface;
   placing a prepreg formed from a fiber-reinforced resin on the tool;
   covering the tool and the prepreg from above the prepreg using a highly stretchable sheet;
   securing the highly stretchable sheet and the frame with a securing jig so that tension is applied to the highly stretchable sheet from a top portion of the prepreg, where the highly stretchable sheet contacts the outer periphery of the prepreg, to the edges of the highly stretchable sheet, thereby forming an enclosed space inside of which the tool and the prepreg are housed; and
   subsequently evacuating the inside of the enclosed space using an evacuation device connected to the inside of the enclosed space, thereby wrapping the prepreg completely around the tool,
   wherein the tool is positioned so that an uppermost portion of the prepreg forms a convex surface in a direction following an outer periphery of the prepreg.

2. The method of fabricating a composite material hollow part according to claim 1, wherein
   a release film is interposed between edges of the prepreg and a member that acts as an underlying substrate beneath the edges of the prepreg.

3. The method of fabricating a composite material hollow part according to claim 1, wherein
   an elastic member that exhibits elasticity in a direction leading from the frame toward the tool is positioned on the frame opposing the tool, and
   a press jig, which is capable of using a reactive force of the elastic member to press against a surface of the tool that faces the frame, is positioned on the elastic member.

4. The method of fabricating a composite material hollow part according to claim 1, wherein, during the evacuation process, vacuum pressure is sequentially applied from the uppermost portion of the tool to a lowermost portion of the tool so that the prepreg is completely around the tool in a single wrapping cycle.

5. The method of fabricating a composite material hollow part according to claim 1, wherein, during the evacuation process, the prepreg is completely wrapped around the tool in a single wrapping cycle.

6. A device for fabricating a composite material hollow part, the device comprising:
   a frame,
   a tool for wrapping a prepreg formed from a fiber-reinforced resin, wherein the tool is positioned so that an uppermost portion of the tools forms a convex surface in a direction following an outer periphery of the prepreg,
   a holding section that holds the tool on the frame with a gap maintained between the tool and the frame,
   a highly stretchable sheet that covers the tool and the prepreg from above the prepreg,
   a securing jig which secures the highly stretchable sheet and the frame so that tension is applied to the highly stretchable sheet from a top portion of the prepreg, where the highly stretchable sheet contacts the outer periphery of the prepreg, to the edges of the highly stretchable sheet, thereby forming an enclosed space inside which the tool and the prepreg are housed, and an evacuation device that is connected to the inside of the enclosed space so as to enable the inside of the enclosed space to be evacuated and the prepreg to be completely wrapped around an outer periphery of the tool.

7. The device for fabricating a composite material hollow part according to claim 6, wherein a release film is disposed between edges of the prepreg and a member that acts as an underlying substrate beneath the edges of the prepreg.

8. The device for fabricating a composite material hollow part according to claim 6, further comprising:

an elastic member, which is positioned on the frame opposing the tool and exhibits elasticity in a direction leading from the frame toward the tool, and a press jig, which is disposed on the elastic member and is capable of using a reactive force of the elastic member to press against a surface of the tool that faces the frame.

* * * * *